(12) United States Patent
Yushio et al.

(10) Patent No.: US 6,174,614 B1
(45) Date of Patent: Jan. 16, 2001

(54) SINTERED ALUMINUM NITRIDE BODY AND METALLIZED SUBSTRATE PREPARED THEREFROM

(75) Inventors: Yasuhisa Yushio; Hirohiko Nakata; Kazutaka Sasaki; Masuhiro Natsuhara; Motoyuki Tanaka, all of Itami (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/178,771

(22) Filed: Oct. 26, 1998

(30) Foreign Application Priority Data

| Oct. 30, 1997 | (JP) | 9-298077 |
| Jan. 22, 1998 | (JP) | 10-010468 |
| Jan. 29, 1998 | (JP) | 10-016815 |
| Sep. 10, 1998 | (JP) | 10-256221 |

(51) Int. Cl.⁷ .............. B32B 18/00; C04B 35/50
(52) U.S. Cl. ............ 428/698; 501/98.4; 501/98.5
(58) Field of Search .............. 428/698; 501/98.4, 501/98.5

(56) References Cited

U.S. PATENT DOCUMENTS

| 4,806,160 | 2/1989 | Hagiwara et al. | 106/1.12 |
| 5,098,449 | * 3/1992 | Hwang et al. | 51/307 |
| 5,154,863 | 10/1992 | Miyahara | 264/65 |

FOREIGN PATENT DOCUMENTS

| 85102159 | 2/1985 | (EP) . |
| 62-153173 | 7/1987 | (JP) . |
| 63-029991 | 2/1988 | (JP) . |
| 63-190761 | 8/1988 | (JP) . |
| 1-183469 | 7/1989 | (JP) . |
| 2-279568 | 11/1990 | (JP) . |
| 5-007349 | 1/1993 | (JP) . |
| 5-071198 | 10/1993 | (JP) . |
| 5-076795 | 10/1993 | (JP) . |
| 6-049613 | 6/1994 | (JP) . |
| 7-17457 | 3/1995 | (JP) . |
| 9-175867 | 7/1997 | (JP) . |

* cited by examiner

Primary Examiner—Francis J. Lorin
(74) Attorney, Agent, or Firm—McDermott, Will & Emery

(57) ABSTRACT

A sintered aluminum nitride body comprising aluminum nitride as the main component and containing a calcium compound, an ytterbium compound, and a neodymium compound. Due to the use of the above calcium-yttrium-neodymium ternary sintering aid, the sintered aluminum nitride body can be obtained by firing a compact of the raw material powder at a low temperature after degreasing the compact without cracking and has evenness of in color, strength and thermal conductivity. The sintered aluminum nitride body provides an inexpensive, high-quality metallized substrate for electronic parts by forming a high-melting metallizing layer of W and/or Mo. Onto the aluminum nitride body, an Ag metallizing layer including oxides of Zn and Cu or an Ag-Pd metallilzing layer including oxides of B, Pb, Cr and Ca and, if necessary, further an insulating vitreous layer may be formed.

23 Claims, No Drawings

SINTERED ALUMINUM NITRIDE BODY AND METALLIZED SUBSTRATE PREPARED THEREFROM

BACKGROUND OF THE INVENTION

1. Field of the Invention

This invention relates to a sintered aluminum nitride body having a high thermal conductivity. More particularly, it relates to a sintered aluminum nitride body which can be produced through low-temperature sintering, has evenness of color and strength, is inexpensive, and has excellent quality. This invention further relates to a metallized substrate comprising the sintered body.

2. Description of the Prior Art

Aluminum nitride (AlN), having a high thermal conductivity and a low coefficient of thermal expansion, is recently coming to be used as insulating substrates for various electronic parts as a substitute for alumina, which has conventionally been used. Sintered aluminum nitride bodies are expected to be used as substrates for high-power hybrid ICs, because they have excellent electrical insulating properties, a high thermal conductivity, and a coefficient of thermal expansion relatively close to that of silicon.

However, since aluminum nitride is generally sintered at a relatively high temperature of 1,800° C. or higher, there are no sintering furnaces, jig parts, etc. which can sufficiently cope therewith. It is therefore necessary to frequently repair sintering furnaces and frequently discard or replace jigs. Moreover, a larger amount of sintering energy is necessary because aluminum nitride is sintered at high temperatures. Consequently, sintered aluminum nitride bodies are more expensive than sintered alumina bodies. This has been an obstacle to the spread of aluminum nitride.

In general, aluminum nitride is more difficult to sinter than alumina. For sintering it, rare earth metal compounds and alkaline earth metal compounds have mainly been used as sintering aids. In particular, combinations of a rare earth metal compound and an alkaline earth metal compound have been investigated in order to lower the sintering temperature, specifically to enable sintering at 1,700° C. or lower. Representative sintering aids comprise a combination of a calcium compound and an yttrium compound, and many investigations have been made thereon.

For example, Japanese Patent Laid-Open No. 153,173/1987, Japanese Patent Publication No. 49,613/1994, Japanese Patent Laid-Open No. 175,867/1997, etc. disclose a sintered body which comprises aluminum nitride, a rare earth element/aluminum oxide, and an alkaline earth element/aluminum oxide and is obtained from aluminum nitride containing a rare earth metal compound and an alkaline earth metal compound in combination. Japanese Patent Laid-Open No. 190,761/1988, Japanese Patent Publication No. 17,457/1995, etc. disclose a sintered body comprising aluminum nitride as the main component and containing a calcium compound and an yttrium compound as sintering aids.

Furthermore, Japanese Patent Publication No. 7,349/1993 discloses a technique for obtaining a dense sintered aluminum nitride body having a high thermal conductivity by adding to aluminum nitride a nitride of a Group 3A element of the Periodic Table and at least one member selected from the group consisting of the oxides and fluorides of Group 3A elements and the nitrides, oxides, and fluorides of Group 2A elements as sintering aids.

In order to use a sintered aluminum nitride body as substrates for electronic parts, such as IC substrates, the aluminum nitride substrate should be metallized. A known technique for this is a metallization method which comprises applying a paste of a high-melting metal, such as tungsten, molybdenum, or tantalum to a surface of a sintered body or green compact and firing the resultant body at a high temperature in a non-oxidizing atmosphere to form a high-melting metallizing layer.

For example, Japanese Patent Laid-Open No. 29,991/1988 discloses a technique in which a conductor layer comprising tungsten, molybdenum, ZrN, TiN, or the like as the main component and containing at least one member selected from the group consisting of rare earth elements and alkaline earth elements is formed on a green compact comprising aluminum nitride containing a sintering aid comprising at least one member selected from the group consisting of rare earth elements and alkaline earth elements, and the green compact and the conductor layer are simultaneously sintered to obtain an aluminum nitride circuit substrate free from warpage and excellent in thermal conductivity, surface resistance, and tensile strength. Japanese Patent Publication No. 71,198/1993 discloses a method for obtaining an aluminum nitride circuit substrate having satisfactory bonding strength which comprises adding $Y_2O_3$ as a sintering aid to aluminum nitride as the main ingredient, sintering the mixture at a temperature as high as 1,800° C., and forming a mixture of a high-melting metal selected between tungsten and molybdenum with at least one member selected from the group consisting of $SiO_2$, $Al_2O_3$, CaO, MgO, BaO, and $B_2O_3$ as an adhesion-enhancing agent on the sintered body through firing at 1,600° C. or higher.

However, the post-firing metallization method in which a metal paste is applied to a surface of a sintered aluminum nitride body and then fired unavoidably leads to a cost increase because a high-temperature treatment for metallization is necessary besides substrate sintering. Although a measure for eliminating the above drawback is the co-firing metallization method in which a metallizing layer is formed by firing a metal paste simultaneously with substrate sintering, this method has a problem that the sintered body has a considerable deformation. There is still another problem that since a metallizing layer comprising at least one high-melting metal as the main component has poor corrosion resistance and poor electrical conductivity, it is generally required to be plated, resulting in an increased cost of the metallized substrate.

For eliminating these problems, a metallization method in which gold, platinum, silver, or the like is used has been developed. For example, Japanese Patent Publication No. 76,795/1993 discloses a circuit substrate comprising an aluminum nitride ceramic base comprising aluminum nitride as the main component and containing at least one member selected from the group consisting of yttrium, rare earth metals, and alkaline earth metals and, disposed on the base, a metallizing layer formed from a paste of silver or gold. According to this method, the adhesion strength between the metallizing layer and the base is ensured mainly with the sintering aid incorporated in the sintered aluminum nitride body.

As described above, due to the use of a rare earth metal compound and an alkaline earth metal compound in combination as a sintering aid, it has become possible to conduct sintering at a lower temperatures than conventional ones and to produce a sintered aluminum nitride body having a high density and a high thermal conductivity. As a result, the use of aluminum nitride is spreading gradually as substrates for highly heat-generating semiconductor elements such as power elements.

However, when sintering is conducted using a calcium/yttrium sintering aid, which is the mainstream at present, the resultant sintered aluminum nitride body has drawbacks of unevenness of color, unevenness of strength, unevenness of thermal conductivity, etc. It has therefore been difficult to obtain a metallized substrate free from unevenness of color and satisfactory in tight adhesion when the sintered aluminum nitride body is metallized with any of the aforementioned metals for use in metallization. Therefore, the yields of the sintered aluminum nitride body and the metallized substrate using this are low, and this has been a major cause of the increased prices of aluminum nitride products.

Furthermore, the presence of a large amount of a binder as carbon in an aluminum nitride powder compact during sintering adversely influences the sintering characteristics of the compact. In particular, when a degreasing step is conducted in a nitrogen atmosphere in order to improve the thermal conductivity, carbon remains in a large amount, resulting in a considerable decrease in sintering characteristics. Consequently, the resultant sintered aluminum nitride body has drawbacks that the density, strength, and thermal conductivity thereof are uneven and a metallizing layer is apt to have reduced adhesiveness. Moreover, use of a calcium compound as one component of a sintering aid has a problem that the degreased compact which has been degreased at several hundreds of degrees Celsius prior to sintering is highly hygroscopic and hence develops many cracks within a short time to become unsuitable for sintering.

As to metallized aluminum nitride substrates, as described above, a metallization method in which gold, silver, or the like is used in place of a high-melting metal has been proposed. However, when this method is used for forming a metallizing layer of gold, silver, or the like on a sintered aluminum nitride body, it has been difficult to obtain satisfactory tight adhesion between the metallizing layer and the sintered body base. This is because the adhesiveness of the metallizing layer generally varies considerably depending on the ingredients other than aluminum nitride contained in the sintered body base, their contents, vitreous ingredients contained in the metallizing layer, their contents, etc. The important properties of the metallizing layer as a member of an electrical circuit, such as the stability of resistivity, also vary depending on these factors. Furthermore, when the metallizing layer as a circuit member requires an insulating coating, it is important to match the insulating vitreous layer with the aluminum nitride base and with the metallizing layer.

SUMMARY OF THE INVENTION

Under the above-described circumstances of prior art techniques, an object of this invention is to provide an inexpensive, high-quality, sintered aluminum nitride body which is obtained through sintering from a degreased body free from cracking and capable of being sintered at a low temperature, and which has evenness of color and is reduced in unevenness of strength and thermal conductivity.

Further, the present invention aims at providing:
an inexpensive, high-quality, high-melting metallized substrate comprising the above-mentioned sintered body as a base and a high-melting metallizing layer having excellent adhesiveness;
a metallized substrate comprising the foregoing sintered body as a base and a metallizing layer which comprises silver or silver-palladium as the main component and which is excellent in adhesiveness and resistor stability; and
a metallized substrate which comprises the sintered body and a metallizing layer and further has an electrical insulating vitreous layer which well matches with the sintered body and the metallizing layer.

The inventors have made intensive studies in order to accomplish the above objects. As a result, they have found that the conventional problems can be significantly mitigated by using a ternary sintering aid consisting of a calcium (Ca) compound, an ytterbium (Yb) compound, and a neodymium (Nd) compound in a specific proportion. This invention has thus been achieved.

Namely, the sintered aluminum nitride body provided by this invention is a sintered body comprising aluminum nitride as the main component and containing a calcium compound, an ytterbium compound, and a neodymium compound. In particular, the sintered body is preferably one which simultaneously satisfies the following relationships concerning the minor components:

$0.01 \leq x \leq 1.0$ and $0.1 \leq (y+z) \leq 10$ wherein x, y, and z are the contents (% by weight) of the calcium compound, ytterbium compound, and neodymium compound in terms of CaO, $Yb_2O_3$, and $Nd_2O_3$, respectively. The sintered body having the above composition preferably further satisfies the relationship $(y+z)/x \geq 10$.

The sintered aluminum nitride body of the present invention may contain a compound of at least one transition element belonging to the Group 8 of the Periodic Table in an amount of 0.01 to 1% by weight in terms of the element. This sintered body not only can be produced through sintering at an even lower temperature, but also can be further reduced in the unevenness of color because it has been colored. These effects are enhanced by regulating the content of the element to 0.1% by weight (1,000 ppm) or higher.

From the standpoints of improving sintering characteristics in obtaining the sintered aluminum nitride body and of improving the adhesion strength of a metallizing layer, the sintered aluminum nitride body is preferably one obtained by adding at least either aluminum oxide or a compound which changes into aluminum oxide upon firing to a powder raw material comprising aluminum nitride and sintering the mixture. The addition amount is preferably in the range of 0.1 to 5% by weight in terms of the oxide based on the sum of the calcium compound, ytterbium compound, and neodymium compound in terms of CaO, $Yb_2O_3$, and $Nd_2O_3$. From the standpoint of heightening the strength of a metallizing layer to be formed on the sintered aluminum nitride body, the sintered aluminum nitride body preferably contains silicon or a silicon compound in an amount of 0.01 to 0.5% by weight in terms of silicon element.

One of the aluminum nitride substrates metallized with a high-melting metal provided by this invention is characterized by comprising the sintered aluminum nitride body described above, which comprises aluminum nitride as the main component and contains a calcium compound, an ytterbium compound, and a neodymium compound, and a high-melting metallizing layer comprising tungsten and/or molybdenum as the main component and formed on at least a part of a surface of the sintered aluminum nitride body.

In the metallized aluminum nitride substrate of this invention, the high-melting metallizing layer preferably contains at least one compound selected from the group consisting of magnesium compounds, calcium compounds, aluminum compounds, and silicon compounds from the standpoint of improving the tight adhesion of the high-melting metallizing layer to the sintered aluminum nitride body. The total content of these compounds in the high-melting metallizing layer is desirably in the range of from 1.0 to 40% by weight in terms of the corresponding oxides.

As processes for producing the aluminum nitride substrate metallized with a high-melting metal of this invention, there are two metallizing processes, i.e., a co-firing metallization process and a post-firing metallization process. One production process of the metallized aluminum nitride substrate by the co-firing metallization process is characterized by comprising: coating at least a part of a surface of a compact of a raw material powder comprising an aluminum nitride powder as the main component and containing a calcium compound powder, an ytterbium compound powder, and a neodymium compound powder with a paste containing as the main component(s) at least one high-melting metal comprising tungsten and/or molybdenum as the main component; and co-firing the resultant structure to obtain a sintered aluminum nitride body and simultaneously form a high-melting metallizing layer.

Another process for producing the metallized aluminum nitride substrate by the post-firing metallization process is characterized by comprising coating at least a part of a surface of a sintered aluminum nitride body comprising aluminum nitride as the main component and containing a calcium compound, an ytterbium compound, and a neodymium compound with a paste containing as the main component(s) at least one high-melting metal comprising tungsten and/or molybdenum as the main component; and firing the resultant structure to form a high-melting metallizing layer.

One of the metallized aluminum nitride substrates provided by this invention comprises a sintered aluminum nitride body comprising aluminum nitride as the main component and containing a calcium compound, an ytterbium compound, and a neodymium compound and, formed on at least a part of the surface of the sintered aluminum nitride body, a metallizing layer comprising silver as the main component and/or a metallizing layer comprising silver-palladium as the main component, and is characterized in that the metallizing layer comprising silver as the main component contains oxides of zinc and copper and the metallizing layer comprising silver-palladium as the main component contains oxides of boron, lead, chromium, and calcium.

The contents of zinc and copper in the metallizing layer are preferably 0.1 to 3.0% by weight in terms of ZnO and 0.1 to 3.0% by weight in terms of CuO, respectively. This metallizing layer may further contain at least one oxide of boron and the content of boron in the layer is preferably up to 2.0% by weight in terms of $B_2O_3$. The total content of boron, zinc, and copper is preferably in the range of from 0.2 to 5.0% by weight in terms of the corresponding oxides.

In the case of the metallizing layer comprising silver-palladium as the main component, the contents of boron, lead, chromium, and calcium in this metallizing layer are preferably 0.3 to 5.0% by weight in terms of $B_2O_3$, 0.3 to 5.0% by weight in terms of PbO, 0.1 to 3.0% by weight in terms of $Cr_2O_3$, and 0.1 to 2.5% by weight in terms of CaO, respectively. The metallizing layer comprising silver-palladium as the main component may further contain at least one oxide selected from the group consisting of oxides of aluminum, nickel, and bismuth. The contents of these elements are preferably up to 1.0% by weight in terms of $Al_2O_3$, up to 0.5% by weight in terms of NiO, and up to 0.5% by weight in terms of $Bi_2O_3$, respectively. The total content of aluminum, boron, lead, chromium, nickel, bismuth, and calcium in this metallizing layer is preferably in the range of from 1.0 to 10% by weight in terms of the corresponding oxides.

The metallized aluminum nitride substrate of this invention may have on at least a part of its surface an electrical insulating vitreous layer which has been formed so as to cover the whole or part of the metallizing layer and comprises at least one oxide of each of zinc, silicon, lead, and manganese. In this case, the contents of zinc, silicon, lead, and manganese in the vitreous layer are preferably 50 to 85% by weight in terms of ZnO, 5.0 to 30% by weight in terms of $SiO_2$, 3.0 to 15% by weight in terms of PbO, and 1.0 to 10% by weight in terms of MnO, respectively.

DETAILED DESCRIPTION OF THE PREFERRED EMBODIMENTS

The reasons why a sintered aluminum nitride body has unevenness of color or instability in strength or thermal conductivity are not necessarily simple, and no definite explanations thereon are known. However, the inventors have reached the technical view that the following explanation is possible on causes of these unfavorable phenomena.

A yttrium compound conventionally used as a main sintering aid combines with the aluminum oxide contained in aluminum nitride to yield yttrium-aluminum oxides such as $2Y_2O_3.Al_2O_3$ (YAM), $3Y_2O_3.5Al_2O_3$ (YAG), and $Y_2O_3.Al_2O_3$ (YAL) mainly at crystal grain boundaries in the sintered body. Rare earth metal compounds other than the yttrium compound likewise yield several kinds of oxides.

Although these oxide phases generate at different temperatures, the distribution of these oxides after completion of sintering is uneven because the body which is being sintered and the sintered body which is being cooled after sintering each has a temperature distribution. Since each oxide, which transmits light and has a light color, is thus unevenly distributed, the sintered body is thought to have unevenness of color. Moreover, since these oxides have different liquid phase temperatures, sintering tends to proceed unevenly, resulting in a sintered body containing many coarse crystal grains having a particle diameter exceeding 5 μm or having many defects. The presence of these crystal grains or defects is thought to cause problems in the sintered body such as density unevenness, deterioration of mechanical strength, and unevenness of thermal conductivity.

In this invention, a calcium-ytterbium-neodymium ternary sintering aid is used in place of conventional binary sintering aids such as, e.g., a calcium-yttrium system, whereby the liquid phase temperatures of the yielded compounds can be lowered to enable the sintering to proceed more evenly. Examples of the calcium compound include CaO and $CaCO_3$. As the ytterbium compound can be used $Yb_2O_3$, $Yb(NO_3)_3.4H_2O$, etc. As the neodymium compound can be used $Nd_2O_3$, $Nd(NO_3)_3.6H_2O$, $Nd_2(CO_3)_3.8H_2O$, etc.

In the case where a calcium-ytterbium-neodymium sintering aid is used in this invention, the sintering behavior can be thought to be as follows. First, with respect to the liquid phase temperatures of oxides generating upon sintering, the liquidus of an ytterbium oxide-aluminum oxide system is at 1,750° C., and that of a neodymium oxide-aluminum oxide system is at 1,720° C. In contrast, the lowest among the liquidus line of conventional yttrium oxide-aluminum oxide systems is at 1,860° C., which is higher by several tens of degrees Celsius than the liquid phase temperatures of the foregoing oxides in this invention.

When two components consisting of an ytterbium compound and a neodymium compound are used in place of a conventional yttrium compound, a calcium-ytterbium-neodymium-aluminum quaternary compound is constituted, which is more complicated than conventional calcium-yttrium-aluminum ternary compounds. These four elements combine with oxygen and/or nitrogen to generate complicated compounds. Although the composition and properties of each compound thus yielded are not fully clear, the generation of more various compounds and a decrease in liquidus line due to these compounds can be expected because the sintering aid according to this invention has a more complicated constitution than conventional ones.

As described above, the use of a calcium-ytterbium-neodymium ternary sintering aid is thought to bring about a lower liquid phase temperature than the conventional calcium-yttrium binary sintering aid. Because of this, sintering is apt to proceed evenly and a sintered aluminum nitride body less uneven in color than conventional ones can be obtained. This even progress of sintering results not only in reduced unevenness in crystal grain diameter and in sintering aid composition but also in significantly diminished defects in the sintered body. As a result, the sintered body can have an improved density, stabilized strength, and evenness of thermal conductivity.

Properties of the compounds which generate when a calcium-ytterbium-neodymium ternary sintering aid is used are also not clear. However, from investigations made by the inventors, these compounds are thought to have deeper colors and smaller color differences among the compounds than the compounds generating with the conventional calcium-yttrium binary sintering aid. It was thus found that this feature also significantly contributes to the diminution of unevenness of color.

Japanese Patent Publication No. 2,742,600 discloses a sintered aluminum nitride body and a process for producing the same. This sintered body comprises AlN as the main component, contains as a sintering aid a combination of ytterbium or a compound thereof and calcium or a compound thereof in amounts of at least 0.5% by weight in terms of ytterbium element and at least 0.005% by weight in terms of calcium element, respectively, and has a bulk density of 3.2 to 3.6 g/cm$^3$ and a thermal conductivity of 120 W/m.K. or higher. However, investigations made by the inventors revealed that since the above invention uses a calcium-ytterbium binary sintering aid not containing neodymium, the temperature at which a liquid phase generates is higher than in this invention and sintering does not evenly proceed.

Furthermore, according to Japanese Patent Publication No. 2,742,600, a large proportion of the calcium and ytterbium added volatilize because the volatilization of the sintering aid is accelerated, for example, by forcibly replacing the gas in the sintering furnace after sintering has sufficiently proceeded to thereby keep the atmosphere surrounding the molded object at a pressure lower than the vapor pressure of the sintering aid, or by conducting sintering in a nitrogen atmosphere containing carbon. More specifically, the patent specification describes that the sintered bodies containing 0.5% by weight ytterbium and 0.005% by weight calcium are obtained by sintering green compacts each containing 3 to 15% by weight $Yb_2O_3$ (2.6 to 13.2% by weight in terms of ytterbium metal) and 0.01 to 2% by weight CaO (0.007 to 1.4% by weight in terms of calcium metal). Consequently, even in the sintered bodies in which the amount of the volatilized sintering aid is the smallest, about four fifths of the ytterbium and about two sevenths of the calcium have been lost by volatilization. From the results of investigations made by the inventors, it was found that sintered bodies which have undergone such sintering aid volatilization have defects at crystal grain interfaces and reflect visible light, and this is causative of unevenness of color.

In contrast, in this invention, since a calcium-ytterbium-neodymium ternary sintering aid is used, a liquid phase generates at a lower temperature and sintering proceeds evenly as stated above. Furthermore, since no step of positively volatilizing the sintering aid is used, at least seven tenths of the sintering aid which was added remains in the sintered body. Consequently, a sintered body can be obtained which is reduced in unevenness of color and has a stable strength as compared with the sintered body of the invention disclosed in the above patent.

In this invention, the calcium-ytterbium-neodymium ternary sintering aid cannot produce its effects described above if the constituent compounds are added in too small amounts. On the other hand, if the sintering aid is added in excess, the thermal conductivity, strength, etc. of the sintered body are reduced. It should be noted that the calcium compound through a degreasing step prior to sintering changes into calcium oxide, which, because of its hygroscopicity, absorbs water from the air and deliquesces to change into calcium hydroxide. Upon this change, the calcium compound expands to cause cracks in the degreased body. Therefore, the upper limit of the amount of the calcium compound to be added should be fixed.

As a result of comprehensive investigations on these points, the inventors have found that the sintered aluminum nitride body especially desirably has such a composition that the contents of the calcium compound, ytterbium compound, and neodymium compound satisfy the relationships $0.01 \leq x \leq 1.0$ and $0.1 \leq (y+z) \leq 10$, wherein x, y, and z are the contents (% by weight) of the three compounds in terms of CaO, $Yb_2O_3$, and $Nd_2O_3$, respectively. It has been further found that preferred effects are obtained when the relationship $(y+z)/x \geq 10$ is satisfied in addition to those relationships.

If the amount of the calcium compound, x, is smaller than 0.01, the effect of the addition cannot be sufficiently produced and the sintered body is apt to have a reduced density and hence an insufficient mechanical strength and an insufficient thermal conductivity. If x exceeds 1.0, the degreased body is apt to have enhanced hygroscopicity and hence develop cracks. If the sum of the ytterbium compound and the neodymium compound, y+z, is smaller than 0.1, there are cases where the effect of the addition cannot be sufficiently produced, resulting in a sintered body which may have a reduced density and hence an insufficient mechanical strength and an insufficient thermal conductivity. If y+z exceeds 10, there are cases where an increased amount of compounds generate at grain boundaries, resulting in a reduced thermal conductivity. Further, if the ratio (y+z)/x is below 10, that is, if the relative amount of the calcium compound becomes too large, the degreased body is more apt to have hygroscopicity and hence develop cracks.

The addition of a compound of a Group 8 element of the Periodic Table, e.g., iron (Fe) or nickel (Ni), to a sintered aluminum nitride body enables the sintered body to be further reduced in unevenness of color because the sintered body is colored by the addition. However, if the compound of a Group 8 element is excessively added, this results in a sintered body having unevenness of strength and color. Consequently, the compound is desirably added in an amount in the range of from 0.01 to 1% by weight in terms of the element. The above effect is enhanced by regulating the content thereof to 0.1% by weight (1,000 ppm) or higher. Since such Group 8 elements form a vitreous layer with inorganic ingredients present in a high-melting metallizing layer, the presence of those elements brings about satisfactory results with respect to the improvement of tight adhesion of the high-melting metallizing layer.

A binder comprising a carbon compound is present in a raw material powder compact for a sintered aluminum nitride body. If the binder is present in excess during firing, this adversely influences the sintering characteristics of the aluminum nitride. When a degreasing step prior to sintering is conducted in the presence of oxygen, e.g., in the air, the presence of residual carbon is almost negligible. However, especially when degreasing is conducted in nitrogen in order to improve thermal conductivity, the residual carbon poses a problem. It is therefore preferable in solving this problem that aluminum oxide or a compound which changes into aluminum oxide upon firing be added to the raw material aluminum nitride powder to be sintered in addition to the calcium compound, ytterbium compound, neodymium compound, etc.

Due to the addition of aluminum oxide or a compound which changes into aluminum oxide upon firing, the excess carbon present in the compact reacts with the aluminum oxide during sintering to change into carbon monoxide (CO) and is thus removed. Through the reaction, the aluminum oxide changes into aluminum nitride by reacting with nitrogen present in the atmosphere. The amount of the aluminum oxide or compound which changes into aluminum oxide upon firing should be 0.1% by weight or larger in terms of $Al_2O_3$ based on the sum of the calcium, ytterbium, and neodymium compounds in terms of CaO, $Yb_2O_3$, and $Nd_2O_3$. However, if aluminum oxide is present excessively, a part of it remains in the sintered aluminum nitride body to impair the thermal conductivity. Hence, the amount of aluminum oxide or its compound in terms of $Al_2O_3$ is preferably 5% by weight or smaller.

As described above, sintering characteristics are improved and a sintered aluminum nitride body reduced in unevenness of color and improved and homogeneous in strength and thermal conductivity is obtained. In order to use this sintered body as a substrate for electronic parts, a metallizing layer comprising, as the main component, a high-melting metal, such as tungsten or molybdenum, or of silver or Ag-Pd, and optionally a vitreous layer is formed on a surface of the sintered body. Thus, there is obtained the metallized substrate.

The sintered aluminum nitride body for use as a base for the metallized substrate and the metallizing layer each can be produced or formed by processes which themselves are basically the same as conventional ones except that the amounts of the additive ingredients are regulated to values in the respective specific ranges. For example, the sintered aluminum nitride body is produced by adding a calcium compound powder, an ytterbium compound powder, and a neodymium compound powder to an AlN powder, optionally further adding powders of a silicon compound, a compound of a Group 8 element, e.g., iron, an aluminum compound, etc., mixing these powders together with a binder, compacting the resultant powder mixture, degreasing the compact, and then sintering the degreased compact in a nitrogen atmosphere.

Although the adhesiveness of the metallizing layer is improved by improving sintering characteristics with the ternary sintering aid or adding a Group 8 element to the sintered body, the adhesion strength of the metallizing layer or vitreous layer can be enhanced by further adding silicon (Si) or a silicon compound to the sintered aluminum nitride body. The reason for this is thought to be as follows. A paste containing a silicon compound is generally used for forming a metallizing layer or a vitreous layer, and the silicon or silicon compound during firing diffuses into and reacts with the sintered body to improve wettability by the paste. However, since the addition of silicon or silicon compound in excess leads to a decrease in the thermal conductivity of the sintered body, the addition amount of silicon or a silicon compound is preferably in the range of from 0.01 to 0.5% by weight in terms of silicon element.

One of the metallized aluminum nitride substrates of the present invention has a metallizing layer on the surface of a sintered aluminum nitride body. Examples of the main component of the high-melting metallizing layer include metals such as tungsten, tantalum, titanium, zirconium, and molybdenum. Especially from the standpoints of the tight adhesion of the metallizing layer, etc., the layer desirably comprises tungsten or molybdenum as the main component. The high-melting metallizing layer comprising tungsten or molybdenum as the main component may contain the elements added to the sintered body, i.e., rare earth elements, alkaline earth elements, silicon, and aluminum, and of transition elements so as to have improved adhesiveness to the sintered body.

In particular, when at least one member selected from the group consisting of magnesium compounds, calcium compounds, aluminum compounds, and silicon compounds is added to the high-melting metallizing layer, diffusion and reaction between these compounds and the sintering aid ingredients contained in the sintered aluminum nitride body are accelerated and the high-melting metallizing layer obtained is dense and has excellent adhesiveness. Therefore, when the layer is plated with nickel, etc., the plating solution does not remain in the high-melting metallizing layer and staining and bubble formation in the plating layer can be diminished. The total content of these compounds in the high-melting metallizing layer is preferably in the range of from 1.0 to 40% by weight in terms of the corresponding oxides.

Processes for producing an aluminum nitride substrate metallized with a high-melting layer are then explained. One process is a so-called post-firing metallization process, in which a sintered aluminum nitride body is produced first and a high-melting metallizing layer is then formed on a surface thereof. Illustratively stated, a calcium compound powder, ytterbium compound powder, and neodymium compound powder are added to an aluminum nitride powder, and powders of a silicon compound, compound of a Group 8 element, aluminum compound, etc. are added thereto according to need. A compact of the resultant raw material powder is sintered. Subsequently, a paste containing a high-melting metal is applied to a surface of the sintered aluminum nitride body obtained, and the coating is baked. The paste may be prepared by adding a glass frit containing the aforementioned additive compounds, etc. to tungsten and/or molybdenum as the main ingredient and mixing the resultant mixture with an organic binder (thickener) and an organic solvent (binder viscosity regulator).

A second process is a so-called co-firing metallization process, in which a high-melting metallizing layer is formed simultaneously with the sintering for forming a sintered aluminum nitride body. Illustratively stated, an organic binder is added to an aluminum nitride raw material powder mixture having the composition described above and the resultant mixture is compacted. The same paste of a high-melting metal as described above is applied to a surface of the compact. The compact is sintered and, simultaneously therewith, the paste is baked. Especially due to the use of a ternary sintering aid, a liquid phase can be formed at low temperatures during sintering aluminum nitride, whereby the aluminum nitride can be sintered simultaneously with the firing of the paste containing a high-melting metal.

An explanation is given below on the case where a metallizing layer comprising silver or silver-palladium is formed on the sintered aluminum nitride body. Silver is preferred as the main component of the metallizing layer because it has high electrical conductivity and relatively excellent corrosion resistance and is less expensive than platinum and gold. Whether silver or silver-palladium is selected as the main component of the metallizing layer depends on uses of the layer. Specifically, a metallizing layer comprising silver as the main component is selected in the case where the metallizing layer is used as an electrode on an electrical circuit substrate or where the electrical circuit is desired to have a reduced resistivity. On the other hand, a metallizing layer comprising silver-palladium as the main component is preferably used, in the case where an electrical circuit having a heightened resistivity is desired or migration is to be prevented.

The metallizing layer comprising silver as the main component contains oxides of zinc and copper as vitreous ingredients, and may further contain an oxide of boron according to need. Oxides of these elements have a good wettability not only to the sintered aluminum nitride body for which calcium, ytterbium, and neodymium compounds were used as a sintering aid, but also to the silver serving as the metal ingredient. Therefore, satisfactory adhesion between the metallizing layer and the sintered aluminum nitride body can be realized.

The contents of zinc and copper in this Ag metallizing layer each are preferably in the range of 0.1 to 3.0% by weight in terms of ZnO and CuO, respectively. If the contents of these elements are outside the above range, there is a fear that the sintering of the vitreous ingredients may require a temperature far higher than the firing temperature for silver or the satisfactory adhesiveness of the layer to the sintered aluminum nitride body base may be impaired.

The amount of boron to be added to the Ag metallizing layer is suitably varied according to the amount of alumina present on the surface of the sintered aluminum nitride body base. Namely, in the case where an oxide layer is present in excess on the surface, there is no need of adding boron to the metallizing silver layer. In the case where the sintered body has not undergone such a treatment, the addition of boron is effective in realizing a glass firing temperature close to a temperature used for silver grain growth. The content of boron in the Ag metallizing layer is preferably up to 2.0% by weight in terms of $B_2O_3$. The reason for this is as follows. $B_2O_3$ lacks water resistance. Hence, when the content of $B_2O_3$ exceeds 2.0% by weight, the layer absorbs water from the air and the adhesion strength is apt to decrease with the lapse of time.

The total content of the vitreous ingredients contained in the metallizing silver layer, i.e., boron, zinc, and copper, is preferably 0.2 to 5.0% by weight in terms of $B_2O_3$, ZnO, and CuO, respectively. If the total content thereof is lower than 0.2% by weight, the strength of adhesion between the metallizing layer and the aluminum nitride is apt to be insufficient. On the other hand, if the content thereof exceeds 5.0% by weight, the vitreous ingredients are present in excess and inhibit the growth of silver grains, resulting in a reduced adhesion strength.

On the other hand, the metallizing layer comprising silver-palladium as the main component contains oxides of boron, lead, chromium, and calcium as vitreous ingredients. It may preferably further contain an oxide of at least one of aluminum, nickel, and bismuth. The boron, lead, chromium, and calcium oxides which are essential vitreous ingredients not only satisfactorily adhere to the calcium, ytterbium, and neodymium compounds contained in the sintered aluminum nitride body, but is satisfactorily wetted by the metal ingredients, silver-palladium, in the metallizing layer. Consequently, the essential vitreous ingredients can realize a satisfactory adhesion strength between the silver-palladium metallizing layer and the sintered aluminum nitride body base.

The contents of boron, lead, chromium, and calcium in the silver-palladium metallizing layer are preferably 0.3 to 5.0% by weight in terms of $B_2O_3$, 0.3 to 5.0% by weight in terms of PbO, 0.1 to 3.0% by weight in terms of $Cr_2O_3$, and 0.1 to 2.5% by weight in terms of CaO, respectively. If the content of any one of these vitreous ingredients is outside the above range, there is a fear that the silver-palladium metallizing layer may have a reduced adhesion strength.

The oxides of aluminum and bismuth as optional vitreous ingredients have a good wettability to the sintered aluminum nitride body, for which a calcium compound, an ytterbium compound, and a neodymium compound were used as a sintering aid. These oxides are also used for regulating the firing temperature for the metallizing layer. Namely, $Al_2O_3$ functions to increase the firing temperature for vitreous ingredients, while $Bi_2O_3$ functions to reduce the firing temperature therefor. Consequently, by suitably adding these substances, the firing temperature for the silver-palladium metallizing layer can be regulated.

The amounts of aluminum and bismuth to be added to the silver-palladium metallizing layer are preferably up to 1.0% by weight in terms of $Al_2O_3$ and up to 0.5% by weight in terms of $Bi_2O_3$, respectively. If the content of $Al_2O_3$ is outside the above range, there is a fear that the firing temperature for vitreous ingredients may be far higher than the temperature for silver-palladium grain growth. If the content of $Bi_2O_3$ is outside the above range, there is a fear that the firing temperature therefor is too low.

Nickel, another optional vitreous ingredient, functions to accelerate the grain growth of silver-palladium as metal ingredients. The amount of nickel to be added is preferably up to 0.5% by weight in terms of NiO. As long as the amount of nickel is in the above range, the satisfactory grain growth of silver-palladium can be sufficiently accelerated. However, if the amount thereof exceeds the above range, there is a fear that silver-palladium grains may grow excessively. As a result, the vitreous ingredients which bond the silver-palladium metallizing layer to the sintered aluminum nitride body base may have a relatively reduced contact area to lower the adhesion strength of the silver-palladium metallizing layer.

The total content of boron, lead, chromium, calcium, aluminum, nickel, and bismuth in the silver-palladium metallizing layer is preferably in the range of 1.0 to 10% by weight in terms of the corresponding oxides. If the total content of these vitreous ingredients is below 1.0% by weight, the adhesion strength of the metallizing layer to the sintered aluminum nitride body base may decrease. If the total content thereof exceeds 10% by weight, the vitreous ingredients are present in excess and inhibit the growth of silver grains, resulting in a reduced adhesion strength.

It has been found that when the metallizing layer comprising silver or silver-palladium as the main component according to this invention is applied to a surface of a sintered aluminum nitride body containing calcium, ytterbium, and neodymium compounds as a sintering aid to form an electrical circuit, then the circuit constituted of the metallizing layer has an extremely reduced dispersion of resistivity. Specifically, conventional silver-palladium metallizing layers each has a resistivity dispersion of about ±20%, whereas the silver-palladium metallizing layer according to this invention can have a resistivity dispersion as small as about ±10%. Although the cause of this is unclear, the reduced dispersion of resistivity may be attributable to the evenness of metallizing layer structure which is thought to be obtained because of extremely good wettability of the oxide ingredients contained in the metallizing layer to the sintered aluminum nitride body containing calcium, ytterbium, and neodymium compounds as a sintering aid, and because of satisfactory adhesion between the vitreous ingredients and the metal ingredient in the metallizing layer.

In addition, the metallizing layer comprising silver as the main component and that comprising silver-palladium as the main component according to this invention can be fired in the wide temperature range of from 800 to 900° C. The reason for this is thought to be that the vitreous ingredients and metal ingredient of the metallizing layer has a good wettability to the sintered aluminum nitride body, for which calcium, ytterbium, and neodymium compounds were used as a sintering aid, and satisfactory adhesion can hence be realized over the wide firing temperature range.

The silver-based metallizing layer and the silver-palladium metallizing layer can be used in combination for producing one metallized substrate. For example, the silver metallizing layer is used as electrode parts of a circuit pattern which are used for external power supply, while the silver-palladium metallizing layer is used as the remaining parts of the circuit. In this case, the bonding between the metallizing layers can be accomplished by overlapping the metallizing layers each other. This means that not only the metallizing silver layer and the silver-palladium metallizing layer each matches with the sintered aluminum nitride body containing calcium, ytterbium, and neodymium compounds, but also the metallizing silver layer and the silver-palladium metallizing layer match with each other.

If the silver metallizing layer and the silver-palladium metallizing layer do not match with each other even though these metallizing layers each matches with the sintered aluminum nitride body containing calcium, ytterbium, and neodymium compounds, the result is pattern peeling or bubbling at the overlapping parts of the two metallizing layers. In this specification, the term "matching" is defined as follows. In the case of laminating metallizing layer(s) and/or insulating vitreous layer(s) onto the aluminum nitride base body by firing, if some layer of the resultant laminated product adversely affects other layer(s) by introducing residual stress into or causing chemical reaction with the latter, peeling or bubbling may occur in the laminated layers even if adhesion between adjacent layers, e.g., between the aluminum nitride base body and the matallizing layer or between the metallizing layer and the insulating vitreous layer, is strong. As a result, this leads to poor adhesion between layers or poor external appearance in the laminated product. Therefore, it is essential that adhesion between layers be established without causing such problems, i.e., without giving residual stress or chemically adverse effect to each other. Such relationship between layers is called "matching" and the "matching" is judged by checking the bubbling or peeling which may occur as a result of stress of each layer and chemical reaction.

The formation of an Ag or Ag-Pd metallizing layer may be conducted in the following manner. Silver or silver-palladium as a metal ingredient is mixed with the aforementioned vitreous ingredients in a given proportion, and a binder and a solvent are added thereto to prepare a paste. Ethyl cellulose, nitrocellulose, or another substance may be used as the binder without particular limitations as long as it functions as a binder. The solvent may, for example, be terpineol. The paste prepared is used to form a pattern for a metallizing layer on the sintered aluminum nitride body by screen printing, and the pattern is fired in the air. Although the firing temperature varies depending on the composition of the vitreous ingredients, it is preferably 800 to 900° C. as stated above in view of the grain growth temperature of the metal ingredient.

This invention further includes a metallized substrate comprising the sintered aluminum nitride body described above, the Ag or Ag-Pd metallizing layer formed on the base body, and an electrical insulating vitreous layer formed thereon. For example, when a metallizing layer formed on the sintered aluminum nitride body is used to form an electric circuit, an insulating vitreous layer can be formed as an overcoat layer in order to ensure electrical insulating properties without fail.

The electrical insulating vitreous layer in this invention comprises an oxide of each of zinc, silicon, lead, and manganese. The contents of the vitreous ingredients Zn, Si, Pb and Mn in the insulating vitreous layer are preferably 50 to 85% by weight in terms of ZnO, 5.0 to 30% by weight in terms of $SiO_2$, 3.0 to 15% by weight in terms of PbO, and 1.0 to 10% by weight in terms of MnO, respectively.

Since these oxides each satisfactorily show a good wettability to the sintered aluminum nitride body containing calcium, ytterbium, and neodymium compounds, satisfactory adhesion can be realized between the sintered aluminum nitride body and the insulating vitreous layer. This insulating vitreous layer has a coefficient of thermal expansion of $3.7 \times 10^{-6}$ to $5.0 \times 10^{-6}$, which is relatively close to that of the sintered aluminum nitride body. Consequently, the sintered aluminum nitride body can be less warped by overcoat formation.

In particular, when the insulating vitreous layer has a composition within the above range, it can be fired at a temperature lower by about 100° C. than the firing temperature (800–900° C.) used for forming the metallizing layer, that is, at about 700° C. If the firing is conducted at a higher temperature, e.g., a temperature lower by only about 50° C. than the firing temperature used for forming the metallizing layer, the vitreous ingredients contained in the metallizing layer mix with the vitreous ingredients contained in the insulating vitreous layer, and this mixing not only is apt to cause bubbling on the metallizing layer but may considerably change the volume resistivity of the metallizing layer. As a result, the metallizing layer may have a considerably increased resistivity.

Throughout the specification, the terms "high-melting metal" and "high-melting metallizing layer" mean a metal having a high melting point and a metallizing layer having a high melting point, respectively.

EXAMPLE 1

To an AlN raw material powder having an average particle size of 0.7 μm and an oxygen content of 1% by weight were added, as shown in the following Table 1, powders of CaO, $CaCO_3$, $Yb_2O_3$, $Nd_2O_3$ and $Y_2O_3$ as a sintering aid and powders of $Fe_2O_3$, $SiO_2$, and $Al_2O_3$. The resultant mixtures each was mixed with an organic binder in a solvent by stirring with ultrasonic to obtain slurries. Each slurry was granulated and compacted. Compact samples 1 to 20 and 28 to 33 were degreased in the air at 500° C., while compact samples 21 to 27 were degreased in nitrogen at 800° C. Thereafter, each compact was sintered in a nitrogen atmosphere at ordinary pressure under the conditions shown in Table 1. In Table 1, the amounts of $CaCO_3$, $Fe_2O_3$, and $SiO_2$ are values in terms of CaO, iron element, and silicon element, respectively.

TABLE 1

| Sample | CaO (wt %) | CaCO$_3$ (wt %) | Yb$_2$O$_3$ (wt %) | Nd$_2$O$_3$ (wt %) | Y$_2$O$_3$ (wt %) | Fe$_2$O$_3$ (wt %) | SiO$_2$ (wt %) | Al$_2$O$_3$ (wt %) | Sintering conditions (° C. × hr) |
|---|---|---|---|---|---|---|---|---|---|
| 1 | 0.007 | — | 0.05 | 0.03 | — | — | — | — | 1700 × 4 |
| 2 | — | 0.01 | 0.10 | 0.03 | — | — | 0.007 | — | 1700 × 4 |
| 3 | — | 0.02 | 0.5 | 1.0 | — | — | — | — | 1700 × 4 |
| 4 | 0.05 | — | 0.3 | 0.25 | — | — | 0.25 | — | 1700 × 4 |
| 5 | — | 0.10 | 0.2 | 0.5 | — | 0.05 | — | — | 1700 × 4 |
| 6 | — | 0.15 | 4.5 | 8.3 | — | 0.01 | — | — | 1700 × 4 |
| 7 | — | 0.20 | 0.3 | 0.5 | — | — | 0.7 | — | 1700 × 4 |
| 8 | — | 0.30 | 0.03 | 0.02 | — | — | — | — | 1700 × 4 |
| 9 | — | 0.40 | 3.8 | 1.5 | — | 1.2 | — | — | 1700 × 4 |
| 10 | 0.45 | — | 6.7 | 2.3 | — | — | 0.01 | — | 1700 × 4 |
| 11 | — | 0.47 | 5.4 | 0.3 | — | — | — | — | 1700 × 4 |
| 12 | 0.50 | — | 5.6 | 1.6 | — | 0.3 | — | — | 1700 × 4 |
| 13 | 0.75 | — | 0.3 | 0.9 | — | — | — | — | 1700 × 4 |
| 14 | — | 1.00 | 0.5 | 0.9 | — | — | 0.5 | — | 1700 × 4 |
| 15 | — | 1.20 | 5.8 | 3.9 | — | 1.0 | — | — | 1700 × 4 |
| 16 | 0.03 | — | 0.5 | 1.8 | — | — | — | — | 1800 × 4 |
| 17 | — | 0.10 | 0.5 | 0.9 | — | 2.0 | — | — | 1700 × 4 |
| 18 | — | 0.08 | 0.3 | 1.5 | — | — | — | — | 1580 × 4 |
| 19 | 0.90 | — | 4.8 | 4.5 | — | — | — | — | 1700 × 4 |
| 20 | — | 0.05 | 0.1 | 0.6 | — | — | — | — | 1700 × 4 |
| 21 | 0.30 | — | 2.8 | 1.5 | — | — | — | 0.11 | 1700 × 5 |
| 22 | 0.50 | — | 4.2 | 3.8 | — | — | — | 0.30 | 1700 × 5 |
| 23 | 0.40 | — | 3.5 | 2.2 | — | — | — | 1.20 | 1700 × 5 |
| 24 | 0.70 | — | 4.5 | 5.2 | — | — | — | 2.32 | 1700 × 5 |
| 25 | 0.50 | — | 3.5 | 3.2 | — | — | — | 4.85 | 1700 × 5 |
| 26 | 0.40 | — | 2.5 | 3.2 | — | — | — | 0.08 | 1700 × 5 |
| 27 | 0.48 | — | 3.5 | 3.8 | — | — | — | 5.50 | 1700 × 5 |
| 28* | 0.1 | — | — | — | 1.4 | — | — | — | 1700 × 4 |
| 29* | — | 0.05 | — | — | 6.4 | — | — | — | 1700 × 4 |
| 30* | — | 0.15 | — | — | 4.0 | — | — | — | 1700 × 4 |
| 31* | 0.1 | — | 1.4 | — | — | — | — | — | 1700 × 4 |
| 32* | — | 0.05 | 6.4 | — | — | — | — | — | 1700 × 4 |
| 33* | — | 0.15 | 4.0 | — | — | — | — | — | 1700 × 4 |

(Note)
The asterisked samples in the table are comparative examples.

With respect to each sample shown in Table 1, a hundred sintered AlN bodies each having dimensions of 10 mm (length) by 10 mm (breadth) by 0.7 mm (thickness) were thus produced. The sintered AlN bodies obtained were visually examined, and the sintered bodies which had a discolored part with an area of 4 mm$^2$ or larger were rated as defective regarding unevenness of color. Thus, the rate of such defectives was determined. On the other hand, fifty test pieces according to JIS R1601 were prepared with respect to each sample, and their three-point flexural strengths were measured. The Weibull coefficients were calculated from the data. The results of these are shown in Table 2 together with the thermal conductivities and relative densities of the sintered AlN body samples.

TABLE 2

| Sample | Defective in unevenness of Color (%) | Three-point flexural strength Average strength (MPa) | Three-point flexural strength Weibull coefficient | Thermal conductivity (W/m · K.) | Relative density (%) |
|---|---|---|---|---|---|
| 1 | 5 | 300 | 8 | 88 | 98.0 |
| 2 | 6 | 340 | 12 | 120 | 99.5 |
| 3 | 7 | 450 | 15 | 125 | 99.7 |
| 4 | 3 | 470 | 16 | 110 | 99.5 |
| 5 | 4 | 320 | 12 | 120 | 99.8 |
| 6 | 6 | 440 | 15 | 90 | 99.5 |
| 7 | 3 | 350 | 9 | 85 | 98.4 |
| 8 | 6 | 360 | 8 | 78 | 98.7 |
| 9 | 2 | 430 | 15 | 88 | 99.5 |
| 10 | 4 | 490 | 18 | 150 | 99.8 |
| 11 | 3 | 420 | 17 | 148 | 99.7 |
| 12 | 2 | 410 | 16 | 170 | 99.8 |
| 13 | 6 | 450 | 14 | 120 | 99.5 |
| 14 | 4 | 420 | 15 | 120 | 99.3 |
| 15 | 3 | 400 | 13 | 140 | 99.7 |
| 16 | 4 | 480 | 17 | 180 | 99.9 |
| 17 | 3 | 380 | 10 | 99 | 99.5 |
| 18 | 4 | 430 | 15 | 120 | 99.7 |
| 19 | 4 | 440 | 16 | 170 | 99.6 |
| 20 | 4 | 400 | 14 | 110 | 99.4 |
| 21 | 4 | 470 | 15 | 160 | 99.5 |
| 22 | 5 | 420 | 14 | 180 | 99.6 |
| 23 | 3 | 490 | 16 | 178 | 99.8 |
| 24 | 5 | 430 | 15 | 185 | 99.5 |
| 25 | 6 | 490 | 17 | 160 | 99.5 |
| 26 | 4 | 320 | 9 | 150 | 94.0 |
| 27 | 5 | 460 | 16 | 120 | 99.8 |
| 28* | 26 | 310 | 8 | 120 | 99.1 |
| 29* | 20 | 340 | 9 | 125 | 99.7 |
| 30* | 18 | 320 | 8 | 110 | 99.5 |
| 31* | 14 | 350 | 11 | 130 | 99.3 |

TABLE 2-continued

| Sample | Defective in unevenness of Color (%) | Three-point flexural strength | | Thermal conductivity (W/m·K.) | Relative density (%) |
|---|---|---|---|---|---|
| | | Average strength (MPa) | Weibull coefficient | | |
| 32* | 13 | 370 | 10 | 136 | 99.8 |
| 33* | 10 | 360 | 10 | 122 | 99.5 |

(Note)
The asterisked samples in the table are comparative examples.

It can be seen from the above results that the use of a calcium-ytterbium-neodymium ternary sintering aid can provide a sintered aluminum nitride body having minimized uneven coloration, stable strength and excellent thermal conductivity as compared with the case of using a conventional calcium-yttrium binary sintering aid (samples 28 to 30) or calcium-ytterbium binary sintering aid (sample 31 to 33). Further, it is also clear that since addition of aluminum oxide in an appropriate amount can remove carbon remaining in a compact, sintered bodies having stable strength and excellent thermal conductivity can be obtained, especially even when degreasing is conducted in nitrogen. Also, it is clear that addition of iron, which is one of transition elements belonging to the Group 8 of the Periodic Table, can further reduce the uneven coloration.

EXAMPLE 2

Sintered AlN body samples 1 to 20 according to this invention obtained in Example 1 were used as substrates. A surface of each sample was processed so as to result in a surface roughness, $R_z$, of 2 μm. Subsequently, a silver-palladium paste was printed on each sample to form a millimeter-square thick paste film. The paste film was fired in the air at 890° C. to obtain a metallizing layer having a thickness of 10 to 20 μm. A tinned copper wire having a diameter of 0.6 mm was soldered to the Ag-Pd metallizing layer so that the whole surface of the silver-palladium metallizing layer part of 1 mm square was wet with the solder. Thereafter, a spring balance was connected to the tinned copper wire and pulled in the direction perpendicular to the substrate. The load at the time when the metallizing layer peeled from the substrate was measured and this value was taken as adhesion strength. The results obtained are shown in the following Table 3.

TABLE 3

| Sample | CaO (wt %) | CaCO₃ (wt %) | Yb₂O₃ (wt %) | Nd₂O₃ (wt %) | Fe₂O₃ (wt %) | SiO₂ (wt %) | Adhesion strength (kg/mm²) |
|---|---|---|---|---|---|---|---|
| 1 | 0.007 | — | 0.05 | 0.03 | — | — | 0.6 |
| 2 | — | 0.01 | 0.10 | 0.03 | — | 0.007 | 0.9 |
| 3 | — | 0.02 | 0.5 | 1.0 | — | — | 0.8 |
| 4 | 0.05 | — | 0.3 | 0.25 | — | 0.25 | 2.0 |
| 5 | — | 0.10 | 0.2 | 0.5 | 0.05 | — | 0.5 |
| 6 | — | 0.15 | 4.5 | 8.3 | 0.01 | — | 0.7 |
| 7 | — | 0.20 | 0.3 | 0.5 | — | 0.7 | 3.8 |
| 8 | — | 0.30 | 0.03 | 0.02 | — | — | 0.6 |
| 9 | — | 0.40 | 3.8 | 1.5 | 1.2 | — | 0.5 |
| 10 | 0.45 | — | 6.7 | 2.3 | — | 0.01 | 1.7 |
| 11 | — | 0.47 | 5.4 | 0.3 | — | — | 0.6 |
| 12 | 0.50 | — | 5.6 | 1.6 | 0.3 | — | 0.7 |
| 13 | 0.75 | — | 0.3 | 0.9 | — | — | 0.5 |
| 14 | — | 1.00 | 0.5 | 0.9 | — | 0.5 | 3.5 |
| 15 | — | 1.20 | 5.8 | 3.9 | 1.0 | — | 0.5 |
| 16 | 0.03 | — | 0.5 | 1.8 | — | — | 0.6 |
| 17 | — | 0.10 | 0.5 | 0.9 | 2.0 | — | 0.8 |
| 18 | — | 0.08 | 0.3 | 1.5 | — | — | 0.5 |
| 19 | 0.90 | — | 4.8 | 4.5 | — | — | 0.6 |
| 20 | — | 0.05 | 0.1 | 0.6 | — | — | 0.7 |

The above results show that the incorporation of appropriate amounts of silicon to sintered bodies was effective in heightening the adhesion strength of the silver-palladium metallizing layer formed on the sintered aluminum nitride body.

EXAMPLE 3

Ten compacts having the same composition as each of samples 1 to 20 obtained in Example 1 and having a diameter of 10 mm and a thickness of 0.8 mm were produced. Subsequently, the compacts were degreased in a nitrogen atmosphere at 800° C. and then stored at room temperature in a desiccator having a humidity of 40%. The time required for a half of the degreased compacts (fifty pieces) to develop cracks during this storage was measured with respect to each sample. The results obtained are shown in Table 4.

TABLE 4

| Sample | CaO (wt %) | CaCO₃ (wt %) | Yb₂O₃ (wt %) | Nd₂O₃ (Wt%) | Fe₂O₃ (wt %) | SiO₂ (wt %) | Time before cracking |
|---|---|---|---|---|---|---|---|
| 1 | 0.007 | — | 0.05 | 0.03 | — | — | No cracking in 300 hr |
| 2 | — | 0.01 | 0.10 | 0.03 | — | 0.007 | No cracking in 300 hr |
| 3 | — | 0.02 | 0.5 | 1.0 | — | — | No cracking in 300 hr |
| 4 | 0.05 | — | 0.3 | 0.25 | — | 0.25 | No cracking in 300 hr |
| 5 | — | 0.10 | 0.2 | 0.5 | 0.05 | — | 270 hr |
| 6 | — | 0.15 | 4.5 | 8.3 | 0.01 | — | No cracking in 300 hr |
| 7 | — | 0.20 | 0.3 | 0.5 | — | 0.7 | 250 hr |
| 8 | — | 0.30 | 0.03 | 0.02 | — | — | 250 hr |
| 9 | — | 0.40 | 3.8 | 1.5 | 1.2 | — | No cracking in 300 hr |
| 10 | 0.45 | — | 6.7 | 2.3 | — | 0.01 | No cracking in 300 hr |
| 11 | — | 0.47 | 5.4 | 0.3 | — | — | No cracking in 300 hr |
| 12 | 0.50 | — | 5.6 | 1.6 | 0.3 | — | No cracking in 300 hr |
| 13 | 0.75 | — | 0.3 | 0.9 | — | — | 200 hr |
| 14 | — | 1.00 | 0.5 | 0.9 | — | 0.5 | 180 hr |
| 15 | — | 1.20 | 5.8 | 3.9 | 1.0 | — | 100 hr |
| 16 | 0.03 | — | 0.5 | 1.8 | — | — | No cracking in 300 hr |
| 17 | — | 0.10 | 0.5 | 0.9 | 2.0 | — | No cracking in 300 hr |
| 18 | — | 0.08 | 0.3 | 1.5 | — | — | No cracking in 300 hr |
| 19 | 0.90 | — | 4.8 | 4.5 | — | — | 290 hr |
| 20 | — | 0.05 | 0.1 | 0.6 | — | — | No cracking in 300 hr |

The above results show that properly controlling the amounts of the calcium compounds contained in compacts were effective not only in eliminating cracking because of moisture absorption but also in improving the stability of the compacts.

EXAMPLE 4

Sintered AlN body samples 1 to 27 produced in Example 1 were used as substrates. A surface of each sample was processed so as to result in a surface roughness, $R_z$, of 2 μm. Subsequently, pastes each comprising tungsten as the main component and having the compositions shown in Table 5 were applied respectively on the main surfaces by printing. The paste films were fired in a nitrogen atmosphere at 1,590° C. to obtain high-melting metallizing layers having a thickness of 10 to 20 μm (post-firing metallization method). The resultant metallized substrate samples 1a to 27a contained the sintered AlN body samples 1 to 27 obtained in Example 1, respectively.

A tinned copper wire having a diameter of 0.5 mm was soldered to the high-melting metallizing layer of each metallized substrate obtained so that the whole surface of the high-melting metallizing layer (1 mm square) was wet with the solder. Thereafter, a spring balance was connected to the tined copper wire and pulled in the direction perpendicular to the substrate. The load at the time when the high-melting metallizing layer peeled from the substrate was measured and this value was taken as adhesion strength. With respect to each sample, a nickel layer having a thickness of 2 μm was formed by plating on the high-melting metallizing layer of each of a hundred metallized substrates obtained in the same manner. The plated substrates were dried in the air at 300° C., and then examined for staining and bubbling to determine the percent defective. The adhesion strength and the percent defectives determined for each sample are shown in Table 5.

TABLE 5

| Sample | MgO (wt %) | CaO (wt %) | Al₂O₃ (wt %) | SiO₂ (wt %) | Y₂O₃ (wt %) | Adhesion strength (kg/mm²) | Percent defective due to staining and bubbling |
|---|---|---|---|---|---|---|---|
| 1a | — | — | — | — | 5.3 | 1.5 | 8.0 |
| 2a | 3.0 | — | 2.0 | — | — | 3.0 | 3.5 |
| 3a | — | 2.0 | — | — | — | 3.2 | 3.0 |
| 4a | — | 4.0 | 10.0 | 10.0 | — | 7.0 | 2.1 |
| 5a | — | — | — | — | 10.5 | 1.5 | 9.0 |
| 6a | 1.2 | — | 2.0 | 19.0 | — | 7.5 | 3.6 |
| 7a | — | 10.0 | 5.0 | 10.0 | — | 7.2 | 3.5 |
| 8a | — | — | 9.0 | — | — | 4.0 | 3.3 |
| 9a | 1.2 | — | 5.0 | 0.2 | — | 8.0 | 3.5 |
| 10a | — | 2.3 | 2.6 | 0.3 | — | 4.8 | 2.9 |
| 11a | 7.0 | — | 3.0 | 8.0 | — | 6.0 | 2.8 |
| 12a | — | — | — | — | 7.1 | 1.2 | 10.5 |
| 13a | 5.0 | — | 12.0 | 8.0 | — | 5.1 | 3.2 |
| 14a | — | — | — | — | 5.3 | 1.3 | 11.6 |
| 15a | 3.0 | — | 2.0 | — | — | 6.9 | 3.6 |
| 16a | — | 2.0 | 1.0 | 0.3 | — | 4.8 | 4.2 |
| 17a | — | 4.0 | 10.0 | 10.0 | — | 9.5 | 2.4 |
| 18a | — | — | — | — | 10.5 | 1.1 | 15.5 |
| 19a | 1.2 | — | 2.0 | 19.0 | — | 5.1 | 3.6 |
| 20a | — | 10.0 | 5.0 | 10.0 | — | 6.9 | 3.5 |
| 21a | 5.0 | — | 9.0 | 12.0 | — | 5.4 | 3.4 |
| 22a | 1.2 | — | 5.0 | 0.2 | — | 7.3 | 3.9 |
| 23a | — | 2.3 | 2.6 | 0.3 | — | 6.9 | 2.8 |
| 24a | 7.0 | — | 3.0 | 8.0 | — | 8.5 | 2.8 |
| 25a | — | — | — | 5.0 | — | 4.2 | 2.5 |
| 26a | 1.0 | 2.0 | 3.0 | — | — | 7.3 | 2.6 |
| 27a | — | 3.0 | 2.0 | 2.0 | — | 8.1 | 2.9 |

It can be seen from the above results that the metallizing layer containing MgO, CaO, Al₂O₃ and SiO₂ and formed on the sintered AlN body having a Ca-Yb-Nd grain boundary phase enhances the adhesion strength and reduces the percent defective due to staining and bubbling as compared with the metallizing layer only with an addition of Y₂O₃.

EXAMPLE 5

Slurries regulated so as to respectively have the same compositions as samples 1 to 27 obtained in Example 1 were molded by the doctor blade method. Pastes which, as shown in Table 6, respectively had the same compositions as samples 1a to 27a shown in Table 5 were applied by printing on the main surfaces of the moldings, respectively. The printed moldings were fired in a nitrogen atmosphere at 1,700° C. for 5 hours to thereby sinter the moldings and, at the same time, bake the pastes (co-firing metallization method). The sintered AlN body parts of the metallized substrate samples 1b to 27b obtained respectively had the same compositions as the sintered AlN body samples 1 to 27 obtained in Example 1.

The metallized substrates were evaluated for adhesion strength of the high-melting metallizing layer by the same method as in Example 4. With respect to each sample, nickel was plated with a thickness of 2 μm on the high-melting metallizing layer of each of a hundred metallized substrates. The plated substrates were dried in the air at 300° C., and then examined for staining and bubbling to determine the percent defective due to staining and bubbling. The results of these are shown in Table 6.

TABLE 6

| Sample | MgO (wt %) | CaO (wt %) | Al₂O₃ (wt %) | SiO₂ (wt %) | Y₂O₃ (wt %) | Adhesion strength (kg/mm²) | Percent defective due to staining and bubbling |
|---|---|---|---|---|---|---|---|
| 1b | — | — | — | — | 5.3 | 2.0 | 8.0 |
| 2b | 3.0 | — | 2.0 | — | — | 4.0 | 3.5 |
| 3b | — | 2.0 | — | — | — | 5.2 | 3.0 |
| 4b | — | 4.0 | 10.0 | 10.0 | — | 9.5 | 2.1 |
| 5b | — | — | — | — | 10.5 | 2.2 | 9.0 |
| 6b | 1.2 | — | 2.0 | 19.0 | — | 11.0 | 3.6 |
| 7b | — | 10.0 | 5.0 | 10.0 | — | 10.5 | 3.5 |
| 8b | — | — | 9.0 | — | — | 4.3 | 3.3 |
| 9b | 1.2 | — | 5.0 | 0.2 | — | 13.0 | 3.5 |
| 10b | — | 2.3 | 2.6 | 0.3 | — | 7.3 | 2.9 |
| 11b | 7.0 | — | 3.0 | 8.0 | — | 7.6 | 2.8 |
| 12b | — | — | — | — | 7.1 | 2.3 | 10.5 |
| 13b | 5.0 | — | 12.0 | 8.0 | — | 7.8 | 3.2 |
| 14b | — | — | — | — | 5.3 | 2.8 | 11.6 |
| 15b | 3.0 | — | 2.0 | — | — | 10.2 | 3.6 |
| 16b | — | 2.0 | 1.0 | 0.3 | — | 4.8 | 4.2 |
| 17b | — | 4.0 | 10.0 | 10.0 | — | 9.9 | 2.4 |
| 18b | — | — | — | — | 10.5 | 1.9 | 15.5 |
| 19b | 1.2 | — | 2.0 | 19.0 | — | 7.5 | 3.6 |
| 20b | — | 10.0 | 5.0 | 10.0 | — | 9.9 | 3.5 |
| 21b | 5.0 | — | 9.0 | 12.0 | — | 7.2 | 3.4 |
| 22b | 1.2 | — | 5.0 | 0.2 | — | 10.8 | 3.9 |
| 23b | — | 2.3 | 2.6 | 0.3 | — | 11.1 | 2.8 |
| 24b | 7.0 | — | 3.0 | 8.0 | — | 12.4 | 2.8 |
| 25b | — | — | — | 5.0 | — | 4.8 | 2.5 |
| 26b | 1.0 | 2.0 | 3.0 | — | — | 9.5 | 3.1 |
| 27b | — | 3.0 | 2.0 | 2.0 | — | 10.0 | 3.3 |

It can be seen from the above results that the metallizing layer containing MgO, CaO, Al₂O₃ and SiO₂ and formed on the sintered AlN body having a Ca-Yb-Nd grain boundary phase enhances the adhesion strength and reduces the percent defective due to staining and bubbling as compared with the metallizing layer only with an addition of Y₂O₃.

EXAMPLE 6

To an AlN raw material powder having an average particle size of 0.65 μm and an oxygen content of 1.2% by weight were added, as shown in the following Table 7, powders of CaO, CaCO₃, Yb₂O₃, Nd₂O₃, and Y₂O₃ as a sintering aid and powders of Fe₂O₃ and SiO₂. Thereto were added an organic binder and a solvent. The resultant mixtures each was treated with a ball mill for 24 hours to prepare slurries. The slurries were formed into sheets by the doctor blade method. Each sheet was cut into pieces of a given size, degreased in nitrogen at 850° C., and then sintered in a nitrogen atmosphere at 1,700° C. to obtain sintered AlN bodies.

TABLE 7

| Sample | CaO (wt %) | CaCO$_3$ (wt %) | Yb$_2$O$_3$ (wt %) | Nd$_2$O$_3$ (wt %) | Y$_2$O$_3$ (wt %) | Fe$_2$O$_3$ (wt %) | SiO$_2$ (wt %) |
|---|---|---|---|---|---|---|---|
| 34 | 0.2 | — | 2.0 | 1.5 | — | — | — |
| 35 | 0.01 | — | 2.0 | 1.5 | — | — | — |
| 36 | — | 0.01 | 2.0 | 1.5 | — | — | — |
| 37 | 1.0 | — | 2.0 | 1.5 | — | — | — |
| 38 | 1.5 | — | 2.0 | 1.5 | — | — | — |
| 39 | — | 0.5 | 2.0 | 1.5 | — | — | — |
| 40 | 0.2 | — | 4.9 | 4.9 | — | — | — |
| 41 | 0.2 | — | 6.0 | 6.0 | — | — | — |
| 42 | 0.2 | — | 0.05 | 0.05 | — | — | — |
| 43 | 0.2 | — | 0.03 | 0.03 | — | — | — |
| 44* | 0.5 | — | — | — | 0.5 | — | — |
| 45 | 0.2 | — | 2.0 | 1.5 | — | 0.5 | 0.5 |

(Note)
The asterisked sample in the table is a comparative example.

(Note) The asterisked sample in the table is a comparative example.

The sintered AlN bodies obtained were visually examined to determine the rate of defectives in unevenness of color. They were further examined to determine the thermal conductivity, three-point flexural strength and Weibull coefficient thereof, and relative density. The results obtained are shown in Table 8. With respect to sample 38, the degreased bodies absorbed moisture excessively to develop cracks and hence failed through sintering to give sintered bodies of a given shape. Therefore, the measurements for determining the rate of defectives in unevenness of color, Weibull coefficient, and thermal conductivity were not made on the sample.

TABLE 8

| Sample | Rate of defective in unevenness of color (%) | Three-point flexural strength Average strength (MPa) | Weibull coefficient | Thermal conductivity (w/m · K.) | Relative density (%) |
|---|---|---|---|---|---|
| 34 | 4 | 460 | 16 | 175 | 99.7 |
| 35 | 3 | 450 | 14 | 173 | 99.5 |
| 36 | 7 | 300 | 7 | 161 | 97.3 |
| 37 | 3 | 430 | 15 | 170 | 99.8 |
| 38 | — | — | — | — | 99.8 |
| 39 | 2 | 410 | 15 | 177 | 99.6 |
| 40 | 7 | 400 | 13 | 171 | 99.7 |
| 41 | 8 | 320 | 8 | 162 | 94.3 |
| 42 | 7 | 390 | 11 | 165 | 99.5 |
| 43 | 2 | 320 | 7 | 143 | 91.7 |
| 44* | 17 | 250 | 13 | 174 | 99.8 |
| 45 | 1 | 440 | 15 | 170 | 99.3 |

(Note)
The asterisked sample in the table is a comparative example.

EXAMPLE 7

Sintered AlN bodies obtained as sample 34 in Example 6 were used as bases, and a silver metallizing layer was formed on a surface of each substrate in the following manner. Oxide powders were added to a silver powder so that the vitreous ingredients through firing came to have the compositions shown in Table 9. Thereto were added ethyl cellulose as a binder and terpineol as a solvent. The resultant mixtures each were sufficiently homogenized with a mortar to prepare pastes. The pastes obtained were screen-printed on the sintered AlN body bases to form 2-mm-square patterns thereon. The patterns were dried and then fired in the air at 850° C. to obtain silver metallizing layers. In each sample, the thickness of the silver metallizing layer after firing was 35 to 45 μm.

The AlN substrates on each of which a silver metallizing layer had been formed as described above were allowed to stand for 24 hours in an atmosphere having a temperature of 40° C. and a humidity of 80% or higher. Thereafter, a tinned copper wire having a diameter of 0.6 mm was soldered to each silver metallizing layer. This copper wire was pulled in the direction perpendicular to the substrate. The load at the time when the silver metallizing layer peeled off was measured and this value was taken as adhesion strength. With respect to each sample, the adhesion strengths of five test pieces were averaged. In the column Judgement in Table 9, the samples having an adhesion strength of 1 to 2 kg, that is the minimum values necessary for practical use, are indicated by ○ and those having an adhesion strength of 2 kg or higher are indicated by ◉. The results showed that all the samples had at least a strength adequate for practical use.

TABLE 9

| Sample | B$_2$O$_3$ (wt %) | ZnO (wt %) | CuO (wt %) | Amount of glass (wt %) | Adhesion strength (kg/mm$^2$) | Judgement |
|---|---|---|---|---|---|---|
| a-1 | 0.2 | 0.5 | 0.5 | 1.2 | 4.0 | ◉ |
| a-2 | 0.5 | 0.5 | 0.5 | 1.5 | 3.1 | ◉ |
| a-3 | 0.7 | 0.5 | 0.5 | 1.7 | 1.8 | ○ |
| a-4 | 0.2 | 0.1 | 0.5 | 0.8 | 2.3 | ◉ |
| a-5 | 0.2 | 3.0 | 0.5 | 3.7 | 2.7 | ◉ |
| a-6 | 0.2 | 3.5 | 0.5 | 4.2 | 1.7 | ○ |
| a-7 | 0.2 | 0.05 | 0.5 | 0.75 | 1.4 | ○ |
| a-8 | 0.2 | 0.5 | 0.1 | 0.8 | 2.5 | ◉ |
| a-9 | 0.2 | 0.5 | 0.05 | 0.75 | 1.8 | ○ |
| a-10 | 0.2 | 0.5 | 3.0 | 3.7 | 2.7 | ◉ |
| a-11 | 0.2 | 0.5 | 3.5 | 4.2 | 1.9 | ○ |
| a-12 | — | 0.1 | 0.1 | 0.2 | 2.9 | ◉ |
| a-13 | 0.2 | 2.4 | 2.4 | 5.0 | 3.2 | ◉ |
| a-14 | 0.5 | 3.0 | 3.0 | 6.5 | 1.8 | ○ |

EXAMPLE 8

Sintered AlN bodies obtained as sample 34 in Example 6 were used as bases, and a silver-palladium metallizing layer was formed on a surface of each base in the following manner. Oxide powders were added to a silver-palladium powder so that the vitreous ingredients through firing came to have the compositions shown in Table 10. Thereto were added ethyl cellulose as a binder and terpineol as a solvent. The resultant mixtures each were sufficiently homogenized with a mortar to prepare pastes. The silver-palladium powder had a silver to palladium ratio of 4:1 by weight. The pastes obtained were screen-printed on the sintered AlN body bases to form 2-mm-square patterns thereon. The patterns were dried and then fired in the air at 850° C. to obtain silver-palladium metallizing layers. In each sample, the thickness of the silver-palladium metallizing layer after firing was 20 to 25 μm.

The AlN substrates on each of which a silver-palladium metallizing layer had been formed as described above were allowed to stand for 24 hours in an atmosphere having a temperature of 40° C. and a humidity of 80% or higher. Thereafter, a tinned copper wire having a diameter of 0.6 mm was soldered to each silver-palladium metallizing layer. This tinned copper wire was pulled in the direction perpendicular to the substrate. The load at the time when the silver-palladium metallizing layer peeled off was measured and this value was taken as adhesion strength. With respect to each sample, the adhesion strengths of five test pieces were averaged. In the column Judgement in Table 10, the samples having an adhesion strength of 1 to 2 kg, that is the minimum values necessary for practical use, are indicated by ○ and those having an adhesion strength of 2 kg or higher are indicated by ⊙. The results showed that all the samples had at least a strength adequate for practical use.

In the judgement of adhesion strengths, the samples whose adhesion strengths were slightly insufficient for practical use because of the insufficient sintering of vitreous ingredients are indicated by Δ and those which have a sufficient adhesion strength are indicated by ○. The results are shown in Table 11. Further, the warpage of each substrate caused during the formation of the insulating vitreous layer was also measured. As a result, the warpage of each sample was satisfactorily small, i.e., up to 20 μm.

TABLE 10

| | Oxides added to Ag—Pd metallizing layer (wt. %) | | | | | | | Amount of | | |
|---|---|---|---|---|---|---|---|---|---|---|
| | $Al_2O_3$ | $B_2O_3$ | PbO | $Cr_2O_3$ | NiO | $Bi_2O_3$ | CaO | glass | Adhesion strength | |
| Sample | (wt %) | (wt %) | (wt %) | (wt %) | (wt %) | (wt %) | (wt %) | (wt %) | (kg/mm$^2$) | Judgement |
| b-1 | 0.1 | 0.35 | 1.6 | 0.55 | 0.1 | 0.1 | 0.3 | 3.1 | 5.2 | ⊙ |
| b-2 | 0.5 | 0.35 | 1.6 | 0.55 | 0.1 | 0.1 | 0.3 | 3.5 | 4.5 | ⊙ |
| b-3 | 1.5 | 0.35 | 1.6 | 0.55 | 0.1 | 0.1 | 0.3 | 4.5 | 1.9 | ○ |
| b-4 | 0.1 | 0.3 | 1.6 | 0.55 | 0.1 | 0.1 | 0.3 | 2.85 | 3.8 | ⊙ |
| b-5 | 0.1 | 0.2 | 1.6 | 0.55 | 0.1 | 0.1 | 0.3 | 2.8 | 1.7 | ○ |
| b-6 | 0.1 | 5.0 | 1.6 | 0.55 | 0.1 | 0.1 | 0.3 | 7.75 | 2.9 | ⊙ |
| b-7 | 0.1 | 6.0 | 1.6 | 0.55 | 0.1 | 0.1 | 0.3 | 8.75 | 1.8 | ○ |
| b-8 | 0.1 | 0.35 | 0.1 | 0.55 | 0.1 | 0.1 | 0.3 | 1.6 | 2.2 | ⊙ |
| b-9 | 0.1 | 0.35 | 0.05 | 0.55 | 0.1 | 0.1 | 0.3 | 1.55 | 1.5 | ○ |
| b-10 | 0.1 | 0.35 | 5.0 | 0.55 | 0.1 | 0.1 | 0.3 | 6.5 | 3.7 | ⊙ |
| b-11 | 0.1 | 0.35 | 7.0 | 0.55 | 0.1 | 0.1 | 0.3 | 8.5 | 1.5 | ○ |
| b-12 | 0.1 | 0.35 | 1.6 | 0.1 | 0.1 | 0.1 | 0.3 | 2.65 | 2.7 | ⊙ |
| b-13 | 0.1 | 0.35 | 1.6 | 0.05 | 0.1 | 0.1 | 0.3 | 2.6 | 1.8 | ○ |
| b-14 | 0.1 | 0.35 | 1.6 | 3.0 | 0.1 | 0.1 | 0.3 | 5.55 | 3.1 | ⊙ |
| b-15 | 0.1 | 0.35 | 1.6 | 4.0 | 0.1 | 0.1 | 0.3 | 6.55 | 1.4 | ○ |
| b-16 | 0.1 | 0.35 | 1.6 | 0.55 | 0.5 | 0.1 | 0.3 | 3.5 | 2.5 | ⊙ |
| b-17 | 0.1 | 0.35 | 1.6 | 0.55 | 0.7 | 0.1 | 0.3 | 3.7 | 1.4 | ○ |
| b-18 | 0.1 | 0.35 | 1.6 | 0.55 | — | 0.1 | 0.3 | 3.0 | 2.7 | ⊙ |
| b-19 | 0.1 | 0.35 | 1.6 | 0.55 | 0.1 | 0.5 | 0.3 | 3.5 | 2.2 | ⊙ |
| b-20 | 0.1 | 0.35 | 1.6 | 0.55 | 0.1 | 0.7 | 0.3 | 3.7 | 1.1 | ○ |
| b-21 | 0.1 | 0.35 | 1.6 | 0.55 | 0.1 | — | 0.3 | 3.0 | 3.3 | ⊙ |
| b-22 | 0.1 | 0.35 | 1.6 | 0.55 | 0.1 | 0.1 | 0.1 | 2.9 | 2.6 | ⊙ |
| b-23 | 0.1 | 0.35 | 1.6 | 0.55 | 0.1 | 0.1 | 0.05 | 2.85 | 1.8 | ○ |
| b-24 | 0.1 | 0.35 | 1.6 | 0.55 | 0.1 | 0.1 | 2.5 | 5.3 | 2.8 | ⊙ |
| b-25 | 0.1 | 0.35 | 1.6 | 0.55 | 0.1 | 0.1 | 3.0 | 5.8 | 1.6 | ○ |
| b-26 | — | 0.2 | 0.4 | 0.2 | 0.05 | — | 0.1 | 1.0 | 2.9 | ⊙ |
| b-27 | — | 0.1 | 0.3 | 0.1 | — | — | 0.1 | 0.6 | 1.0 | ○ |
| b-28 | 0.4 | 1.7 | 3.5 | 2.2 | 0.3 | 0.4 | 1.5 | 10.0 | 4.3 | ⊙ |
| b-29 | 0.4 | 1.8 | 4.0 | 2.5 | 0.4 | 0.4 | 1.5 | 11.0 | 1.9 | ○ |

EXAMPLE 9

Sintered AlN body bases obtained as sample 34 in Example 6 were cut into a size of 50 mm (length) by 50 mm (breadth) by 0.5 mm (thickness), and an insulating vitreous layer was formed on a surface of each base in the following manner. To oxide powders having the compositions shown in the following Table 11 were added ethyl cellulose as a binder and terpineol as a solvent. The resultant mixtures each was sufficiently homogenized with a mortar to prepare glass pastes. In the same manner as in Examples 7 and 8, these pastes were screen-printed on the bases to form a 45-mm-square pattern around the center of each substrate. The patterns were dried and fired in the air at 700° C. to form insulating vitreous layers, which each had a thickness of 45 to 55 μm.

The insulating vitreous layers obtained were scribed with the tip of a cutting knife to evaluate their adhesion strengths.

The same silver paste as sample a-1 shown in Table 9 given in Example 7 was printed on sintered AlN body bases as sample 34, as in the above, to form a pattern having a size of 10 mm by 40 mm (width) on each base. The patterns were dried. The same silver-palladium paste as sample b-1 shown in Table 10 given in Example 8 was further printed on each base to form a pattern having a size of 10 mm by 40 mm (width) which was 10 mm apart from the silver pattern. These patterns were dried. Thereafter, all patterns were fired in the air at 850° C. to obtain metallized substrates. The pastes shown in the following Table 11 were each screen-printed in the same manner as the above on the metallized substrates obtained above and fired in the air at 700° C. to form insulating vitreous layers. The matching of the underlying Ag metallizing layer and Ag-Pd metallizing layer with each vitreous layer was examined, and the results obtained are shown in Table 11. In Table 11, good matching and occurrence of bubbling between layers are indicated by ○ and Δ, respectively.

TABLE 11

| Sample | ZnO (wt. %) | SiO$_2$ (wt. %) | PbO (wt. %) | MnO (wt. %) | Adhesiveness of vitreous layer | Layer-to-layer matching | Remarks |
|---|---|---|---|---|---|---|---|
| c-1 | 70 | 17 | 10 | 3.0 | ◯ | ◯ | |
| c-2 | 50 | 30 | 15 | 5.0 | ◯ | ◯ | |
| c-3 | 45 | 30 | 15 | 10 | ◯ | △ | Bubbling on Ag—Pd |
| c-4 | 85 | 10 | 3.5 | 1.5 | ◯ | ◯ | |
| c-5 | 90 | 5 | 3.5 | 1.5 | △ | ◯ | Insufficient glass sintering |
| c-6 | 80 | 5 | 10 | 5 | ◯ | ◯ | |
| c-7 | 82 | 3 | 10 | 5 | △ | ◯ | Insufficient glass sintering |
| c-8 | 55 | 30 | 10 | 5 | ◯ | ◯ | |
| c-9 | 55 | 35 | 12 | 8 | ◯ | △ | Bubbling on Ag and Ag—Pd |
| c-10 | 70 | 17 | 3 | 10 | ◯ | ◯ | |
| c-11 | 70 | 18 | 2 | 10 | △ | ◯ | Insufficient glass sintering |
| c-12 | 70 | 10 | 15 | 5 | ◯ | ◯ | |
| c-13 | 65 | 10 | 18 | 7 | ◯ | △ | Bubbling on Ag—Pd |
| c-14 | 70 | 19 | 10.5 | 1.0 | ◯ | ◯ | |
| c-15 | 70 | 19 | 10 | 0.5 | △ | ◯ | Insufficient glass sintering |
| c-16 | 70 | 10 | 10 | 10 | ◯ | ◯ | |
| c-17 | 67.5 | 10 | 10 | 12.5 | ◯ | △ | Bubbling on Ag and Ag—Pd |

Table 11 shows the following. Samples c-5, 7, 11, and 15, where the adhesion strength of the insulating vitreous layers was slightly poor, each was insufficient in glass sintering. In samples c-3, 9, 13, and 17, bubbling had occurred on the metallizing silver layer and/or silver-palladium metallizing layer. Although the insufficient glass sintering and the bubbling on a metallizing layer pose no problem when the metallized substrates are used as circuit substrates, they arouse troubles in applications where the interface between the metallizing layer and the insulating vitreous layer is required to have a withstand voltage of at least hundreds of volts.

EXAMPLE 10

In order to examine metallizing layers for resistivity dispersion, the following experiment was conducted. Ten sintered AlN body bases were prepared with respect to each of samples 34, 35, and 45 according to this invention and sample 44 as a comparative example which all were produced in Example 6. A paste having the same composition as sample a-1 given in Table 9 in Example 7 was screen-printed on the surfaces of the sintered AlN body bases to form the same pattern thereon as in Example 7. The patterns were fired in the air at 850° C. to form metallizing silver layers. With respect to each of the metallized substrates obtained, the resistivity of the metallizing silver layer was measured by the DC four-terminal method. The found values and the dispersion thereof (maximum-minimum) are shown in Table 12.

TABLE 12

| AlN Base | Found resistivity value (Ω) | | | | | | | | | | Dispersion (Ω) |
|---|---|---|---|---|---|---|---|---|---|---|---|
| Sample-34 | 4.2 | 4.2 | 4.1 | 4.4 | 3.8 | 3.9 | 4.3 | 3.8 | 4.2 | 4.0 | 0.6 |
| Sample-35 | 4.1 | 4.5 | 3.8 | 3.9 | 4.3 | 4.0 | 4.2 | 3.7 | 4.2 | 4.1 | 0.8 |
| Sample-44* | 3.7 | 4.8 | 4.3 | 3.5 | 3.4 | 4.2 | 3.9 | 3.4 | 4.1 | 4.0 | 1.4 |
| Sample-45 | 3.9 | 4.1 | 4.2 | 4.5 | 3.9 | 4.2 | 4.0 | 3.8 | 4.0 | 4.3 | 0.7 |

Table 12 shows that the metallized substrates according to this invention obtained by forming a metallizing silver layer on sintered AlN body bases each containing calcium, ytterbium, and neodymium compounds had smaller resistivity dispersions than the metallized substrate made using a conventional sintered AlN body base.

EXAMPLE 11

To the same AlN raw material powder as in Example 6 were added powders of CaO, Yb$_2$O$_3$, and Nd$_2$O$_3$ as a sintering aid and an Al$_2$O$_3$ powder in the proportions shown in Table 13. Sintered AlN bodies were prepared in the same manner as in Example 6. The same silver paste as sample a-1 given in Table 9 in Example 7 and the same silver-palladium paste as sample b-1 given in Table 10 in Example 8 were printed on each of the sintered AlN bodies obtained to form a 2-mm-square pattern of each paste. The patterns were fired in the air at 850° C. to form metallizing layers. With respect to each metallized substrate obtained, the adhesion strengths of the metallizing layers were measured in the same manner as in Example 7. The results are shown in Table 13 together with the thermal conductivity and relative density of each sintered AlN body.

TABLE 13

| Sample | CaO (wt %) | Yb$_2$O$_3$ (wt %) | Nd$_2$O$_3$ (wt %) | Al$_2$O$_3$ (wt %) | Thermal conductivity (w/m·K.) | Relative density (%) | Adhesion strength (kg/mm$^2$) Ag layer | Adhesion strength (kg/mm$^2$) Ag—Pd layer |
|---|---|---|---|---|---|---|---|---|
| 46 | 0.3 | 2.8 | 1.5 | 0.11 | 160 | 99.5 | 3.7 | 4.9 |
| 47 | 0.5 | 4.2 | 3.8 | 0.3 | 180 | 99.6 | 3.8 | 4.8 |
| 48 | 0.4 | 3.5 | 2.2 | 1.2 | 178 | 99.8 | 3.6 | 5.0 |
| 49 | 0.7 | 4.5 | 5.2 | 2.32 | 185 | 99.5 | 4.0 | 5.2 |
| 50 | 0.5 | 3.5 | 3.2 | 4.85 | 160 | 99.5 | 4.2 | 5.5 |
| 51 | 0.48 | 3.5 | 3.8 | 5.5 | 120 | 99.8 | 4.7 | 5.6 |

EXAMPLE 12

Sintered AlN bodies comprising AlN as the main component and respectively having the minor-component compositions shown in Table 14 were prepared in the same manner as in Examples 6 and 11. The same silver paste as sample a-1 given in Table 9 in Example 7 and the same silver-palladium paste as sample b-1 given in Table 10 in Example 8 were printed on a surface of each sintered AlN body base in the same manner as in Examples 7 and 8, respectively. The patterns were fired in the air at 850° C. With respect to each metallized AlN substrate obtained, the adhesion strengths of the metallizing silver layer and the silver-palladium metallizing layer were measured in the same manner as in Example 7. The results are shown in Table 14.

Thereafter, the same glass paste as sample c-1 given in Table 11 in Example 9 was applied to each of the above metallized AlN substrates having the Ag metalllizing layer or the Ag-Pd metallizing layer, and fired in the air at 700° C. to form an insulating vitreous layer on the metallizing layers. The insulating vitreous layers obtained were examined for matching with each metallizing layer. The results of the above measurement and examination are shown in Table 14. These metallized AlN substrates each having an insulating vitreous layer were examined for the electrical resistivity of each metallizing layer by the DC four-terminal method. As a result, the found values of electrical resistivity for each metallizing layer were about 3.9 to 4.6 Ω, and the dispersion thereof was within 0.7 Ω.

samples according to this invention had high metallizing layer adhesion strengths and were excellent in matching of the insulating vitreous layer.

According to this invention, a sintered aluminum nitride body reduced in the unevenness of each of color, strength, and thermal conductivity as compared with conventional sintered aluminum nitride bodies obtained with a calcium-yttrium or calcium-ytterbium binary sintering aid can be provided.

Since the sintering of aluminum nitride can be conducted stably at a lower temperature than in conventional techniques, the growth of crystal grains in the sintered aluminum nitride body can be inhibited. As a result, chipping during cutting can be diminished. Hence, the sintered aluminum nitride body is suitable also for use in applications where high-precision peripheral processing is required for production in automated lines, e.g., submounts for laser diodes.

In addition, an inexpensive metallized aluminum nitride substrate of high quality can be provided which comprises the sintered body and formed thereon a high-melting metallizing layer having excellent adhesiveness.

Furthermore, by forming a silver metallizing layer and/or a silver-palladium metallizing layer each containing specific vitreous ingredients on a surface of the sintered body, a metallized aluminum nitride substrate can be provided which combines satisfactory adhesion with excellent resistivity stability. When a glass comprising oxides of zinc, silicon, lead, and manganese is applied to the metallized

TABLE 14

| Sample | Minor-component composition in sintered AlN body (wt %) CaO | Yb$_2$O$_3$ | Nd$_2$O$_3$ | Y$_2$O$_3$ | SiO$_2$ | Fe$_2$O$_3$ | Al$_2$O$_3$ | Adhesion strength (kg/mm$^2$) Ag layer | Adhesion strength (kg/mm$^2$) Ag—Pd layer | Layer-to-layer Matching |
|---|---|---|---|---|---|---|---|---|---|---|
| 52 | 0.2 | 2.0 | 1.5 | — | — | — | — | 4.0 | 5.2 | ○ |
| 53* | 0.5 | — | — | 0.5 | — | — | — | 1.5 | 1.7 | Bubbling |
| 54 | 0.2 | 2.0 | 1.5 | — | 0.5 | 0.5 | — | 3.6 | 4.2 | ○ |
| 55 | 0.3 | 2.8 | 1.5 | — | — | — | 0.11 | 4.3 | 4.9 | ○ |

(Note)
The asterisked samples in the table are comparative examples.

The above results show the following. Sample 53, which had been obtained using a sintered AlN body base having a conventional sintering aid composition, had low metallizing layer adhesion strengths and suffered bubbling on the silver-palladium metallizing layer, showing that the matching of the insulating vitreous layer was poor. In contrast, the aluminum nitride substrate, an insulating vitreous layer satisfactorily matching with the metallizing layer and aluminum nitride base and the electrical insulation of the metallizing layer can be ensured.

Therefore, this invention can heighten the yields of sintered aluminum nitride bodies and metallized aluminum nitride substrates comprising the same and reduce the production costs thereof. This invention thus greatly contributes to the spread of aluminum, nitride as substrates for electronic parts, etc.

What is claimed is:

1. A sintered aluminum nitride body comprising aluminum nitride as the main component and containing a calcium compound, an ytterbium compound, and a neodymium compound, in contents satisfying the following relationship:

$0.01 \leq x \leq 1.0$ and $0.1 \leq (y+z) \leq 10$ wherein x, y, and z are the contents (% by weight) of the calcium compound, ytterbium compound, and neodymium compound in terms of CaO, $Yb_2O_3$, and $Nd_2O_3$, respectively.

2. A sintered aluminum nitride body as set forth in claim 1, wherein x, y, and z satisfy $(y+z)/x \geq 10$.

3. A sintered aluminum nitride body as set forth in claim 1, which contains a compound of at least one transition element belonging to the Group 8 of the Periodic Table in an amount of 0.01 to 1% by weight in terms of the element.

4. A sintered aluminum nitride body as set forth in claim 1, which contains silicon or a silicon compound in an amount of 0.01 to 0.5% by weight in terms of silicon element.

5. A sintered aluminum nitride body as set forth in claim 1, which is a sintered body obtained by sintering a raw material powder containing aluminum nitride with an addition of either aluminum oxide or a compound which changes into aluminum oxide by firing in an amount of 0.1 to 5% by weight in terms of the oxide based on the sum of the calcium compound, ytterbium compound, and neodymium compound in terms of CaO, $Yb_2O_3$, and $Nd_2O_3$.

6. A metallized aluminum nitride substrate which comprises a sintered aluminum nitride body comprising aluminum nitride as the main component and containing a calcium compound, an ytterbium compound, and a neodymium compound, in contents satisfying the following relationship:

$0.01 \leq x \leq 1.0$ and $0.1 \leq (y+z) \leq 10$ wherein x, y, and z are the contents (% by weight) of the calcium compound, ytterbium compound, and neodymium compound in terms of CaO, $Yb_2O_3$, and $Nd_2O_3$, respectively and, formed on at least a part of a surface of the sintered aluminum nitride body, a high-melting metallizing layer comprising tungsten and/or molybdenum as the main component.

7. A metallized aluminum nitride substrate as set forth in claim 6, wherein the high-melting metallizing layer contains at least one compound selected from the group consisting of magnesium compounds, calcium compounds, aluminum compounds, and silicon compounds.

8. A metallized aluminum nitride substrate as set forth in claim 7, wherein the total content of the magnesium compounds, calcium compounds, aluminum compounds, and silicon compounds in the high-melting metallizing layer is 1.0 to 40% by weight in terms of the corresponding oxides.

9. A process for producing a metallized aluminum nitride substrate which comprises: coating at least a part of a surface of a compact made of a raw material powder comprising an aluminum nitride powder as the main component and containing a calcium compound powder, an ytterbium compound powder, and a neodymium compound powder with a paste containing as the main component(s) at least one high-melting metal comprising tungsten and/or molybdenum as the main component; and firing the resultant structure to obtain a sintered aluminum nitride body and simultaneously form a high-melting metallizing layer.

10. A process for producing a metallized aluminum nitride substrate which comprises: coating at least a part of a surface of a sintered aluminum nitride body comprising aluminum nitride as the main component and containing a calcium compound, an ytterbium compound, and a neodymium compound with a paste containing as the main component(s) at least one high-melting metal comprising tungsten and/or molybdenum as the main component; and firing the resultant structure to form a high-melting metallizing layer.

11. A process for producing a metallized aluminum nitride substrate as set forth in claim 9, wherein the paste contains at least one compound selected from the group consisting of magnesium compounds, calcium compounds, aluminum compounds, and silicon compounds.

12. A process for producing a metallized aluminum nitride substrate as set forth in claim 10, wherein the paste contains at least one compound selected from the group consisting of magnesium compounds, calcium compounds, aluminum compounds, and silicon compounds.

13. A metallized aluminum nitride substrate comprising a sintered aluminum nitride body comprising aluminum nitride as the main component and containing a calcium compound, an ytterbium compound, and a neodymium compound, in contents satisfying the following relationship:

$0.01 \leq x \leq 1.0$ and $0.1 \leq (y+z) \leq 10$ wherein x, y, and z are the contents (% by weight) of the calcium compound, ytterbium compound, and neodymium compound in terms of CaO, $Yb_2O_3$, and $Nd_2O_3$, respectively, formed on at least a part of a surface of a sintered aluminum nitride body, a metallizing layer comprising silver as the main component and/or a metallizing layer comprising silver-palladium as the main component, wherein the metallizing layer comprising silver as the main component contains oxides of zinc and copper and the metallizing layer comprising silver-palladium as the main component contains oxides of boron, lead, chromium, and calcium.

14. A metallized aluminum nitride substrate as set forth in claim 13, wherein the contents of zinc and copper in the metallizing layer comprising silver as the main component are 0.1 to 3.0% by weight in terms of ZnO and 0.1 to 3.0% by weight in terms of CuO, respectively.

15. A metallized aluminum nitride substrate as set forth in claim 14, wherein the metallizing layer comprising silver as the main component further contains an oxide of boron, and the content of boron is up to 2.0% by weight in terms of $B_2O_3$.

16. A metallized aluminum nitride substrate as set forth in claim 14, wherein the total content of zinc, and copper in the metallizing layer comprising silver as the main component is 0.2 to 5.0% by weight in terms of the corresponding oxides.

17. A metallized aluminum nitride substrate as set forth in claim 15, wherein the total content of boron, zinc, and copper in the metallizing layer comprising silver as the main component is 0.2 to 5.0% by weight in terms of the corresponding oxides.

18. A metallized aluminum nitride substrate as set forth in claim 13, wherein the contents of boron, lead, chromium, and calcium in the metallizing layer comprising silver-palladium as the main component are 0.3 to 5.0% by weight in terms of $B_2O_3$, 0.3 to 5.0% by weight in terms of PbO, 0.1 to 3.0% by weight in terms of $Cr_2O_3$, and 0.1 to 2.5% by weight in terms of CaO, respectively.

19. A metallized aluminum nitride substrate as set forth in claim 18, wherein the metallizing layer comprising silver-palladium as the main component further contains an oxide of at least one element selected from the group consisting of aluminum, nickel, and bismuth, and the contents of these elements are up to 1.0% by weight in terms of $Al_2O_3$, up to 0.5% by weight in terms of NiO, and up to 0.5% by weight in terms of $Bi_2O_3$, respectively.

20. A metallized aluminum nitride substrate as set forth in claim 18, wherein the total content of boron, lead, chromium, and calcium in the metallizing layer comprising silver-palladium as the main component is 1.0 to 10% by weight in terms of the corresponding oxides.

21. A metallized aluminum nitride substrate as set forth in claim 19, wherein the total content of aluminum, boron, lead, chromium, nickel, bismuth, and calcium in the metallizing layer comprising silver-palladium as the main component is 1.0 to 10% by weight in terms of the corresponding oxides.

22. A metallized aluminum nitride substrate as set forth in claim 13, which has on at least a part of its surfaces an electrical insulating vitreous layer formed so as to cover the whole or a part of the metallizing layer, the vitreous layer comprising an oxide of each of zinc, silicon, lead, and manganese.

23. A metallized aluminum nitride substrate as set forth in claim 22, wherein the contents of zinc, silicon, lead, and manganese in the electrical insulating vitreous layer are 50 to 85% by weight in terms of ZnO, 5.0 to30% by weight in terms of $SiO_2$, 3.0 to 15% by weight in terms of PbO, and 1.0 to 10% by weight in terms of MnO, respectively.

* * * * *